US007529858B2

(12) United States Patent
Engelmeyer et al.

(10) Patent No.: US 7,529,858 B2
(45) Date of Patent: May 5, 2009

(54) HARD DISK DRIVE CONTROLLER HAVING VERSATILE CHIP CONNECTOR HAVING PRINTED CIRCUIT BOARD ENGAGED BY AT LEAST TWO DATA PORTS HAVING TWO PAIRS OF DIFFERENTIAL CONNECTOR ELEMENTS

(75) Inventors: Philip Joseph Engelmeyer, Rochester, MN (US); Miroki Nonaka, Kanagawa (JP); Paul Emmit Larson, Jr., Rochester, MN (US); Dennis Carl Mairet, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 14 days.

(21) Appl. No.: 11/847,519

(22) Filed: Aug. 30, 2007

(65) Prior Publication Data

US 2007/0293090 A1 Dec. 20, 2007

Related U.S. Application Data

(62) Division of application No. 10/869,980, filed on Jun. 16, 2004, now Pat. No. 7,334,052.

(51) Int. Cl.

*G06F 11/00* (2006.01)
*G11B 5/012* (2006.01)
*H05K 7/10* (2006.01)

(52) U.S. Cl. .................. 710/2; 710/8; 710/15; 710/36; 710/38; 716/1; 716/2; 716/3; 716/4; 361/796; 439/61; 439/68; 439/218; 174/70 R; 174/72 R; 174/72 A; 174/251

(58) Field of Classification Search ..................... 710/2, 710/8, 15, 36, 38; 716/1-4; 174/251, 70 R, 174/72 R, 72 A; 361/796; 439/61, 68, 218

See application file for complete search history.

(56) References Cited

U.S. PATENT DOCUMENTS

| | | | | |
|---|---|---|---|---|
| 6,006,295 | A * | 12/1999 | Jones et al. | 710/62 |
| 6,115,771 | A * | 9/2000 | Born | 710/315 |
| 6,377,471 | B1 * | 4/2002 | Chong et al. | 361/796 |
| 6,484,290 | B1 * | 11/2002 | Chien et al. | 716/1 |
| 6,697,976 | B1 * | 2/2004 | Satoh et al. | 714/704 |
| 6,809,895 | B1 * | 10/2004 | Choi | 360/61 |
| 6,884,085 | B1 * | 4/2005 | Goldstone | 439/62 |
| 6,925,531 | B2 * | 8/2005 | Konshak et al. | 711/114 |
| 2003/0110330 | A1 * | 6/2003 | Fujie et al. | 710/36 |
| 2004/0094328 | A1 * | 5/2004 | Fjelstad et al. | 174/251 |

* cited by examiner

*Primary Examiner*—Tammara Peyton
(74) *Attorney, Agent, or Firm*—John L. Rogitz

(57) ABSTRACT

A hard disk controller (HDC) chip has interchangeable "A" and "B" ports of differential connector element pairs, with one connector element of each pair being disposed closest to the edge of the chip and with the other element inboard of it to facilitate connection to more than one printed circuit board (PCB) serial interface pinout without crossing traces of a pair and with maintaining traces of a pair parallel and on the same PCB level.

9 Claims, 5 Drawing Sheets

*Fig. 1* SYSTEM

HARD DISK DRIVE CONTROLLER HAVING VERSATILE CHIP CONNECTOR HAVING PRINTED CIRCUIT BOARD ENGAGED BY AT LEAST TWO DATA PORTS HAVING TWO PAIRS OF DIFFERENTIAL CONNECTOR ELEMENTS

This is a divisional of U.S. patent application Ser. No. 10/869,980, filed Jun. 16, 2004, now U.S. Pat. No. 7,334,052 from which priority is claimed.

FIELD OF THE INVENTION

The present invention relates generally to hard disk drives (HDD).

BACKGROUND

The use of computer hard disk drives (HDD), both magnetic and optical, is well known in a wide number of computer fields, including personal computing. In computers, data is stored and retrieved from one or more disk drives by commands transmitted to the storage subsystem over a system bus.

With more particularity, a HDD has a hard disk controller (HDC), typically implemented as a chip that is mounted to a printed circuit board (PCB), with the HDC chip having connector elements (such as hemispherical structures referred to as "balls") which electrically mate with complementary elements (such as flat pads) on the PCB. In turn, the PCB is electrically connected to the central processing unit (CPU) of a computer to communicate data between the HDD and CPU.

As recognized herein, more than a single communication interface exists and, hence, more than a single PCB connector element pattern exists. For example, it might be desirable to use a HDC with both serial interfaces such as serial ATA ("SATA")-based PCBs and serial attached SCSI ("SAS"), and with PCBs configured for fibre channel arbitrated loop ("FCAL") operation. SAS and FCAL are serial interfaces that have two connection "ports", with each port having two pairs (a positive and a negative) of differential wires to support simultaneous two-way communication. Moreover, the side of the PCB on which the HDC chip is mounted can depend on the particular configuration (referred to as "form factor") of a HDD, with the PCB connector arrangement on one side being a mirror image of the arrangement on the other side. Thus, as between the two interfaces, four possible connector element arrangements exist.

As further recognized herein, however, because SAS and FCAL are similar in that they are both serial interfaces with two ports of pairs of differential wires, it is desirable for manufacturing convenience to use a single HDC connector element arrangement with more than one PCB layout, rather than provide four different HDC chip connector element arrangements. However, as can be appreciated from the above discussion, a single HDC layout would require different electrical trace routings from the connector elements of the HDC to the various connector elements of the PCB, depending on the type of PCB and form factor of the HDD. As further recognized herein, not all trace routings are desirable. For instance, it is undesirable for the two traces connected to the two connector elements of a differential pair to be separated from each other by a large distance or to cross each other on the same plane of the PCB. It is also undesirable to have to use more than two PCB levels to avoid trace crossings. Accordingly, the challenge addressed by the present invention is to provide a single HDC connector element arrangement that can be used with four different PCB connector element arrangements without any traces crossing on the same level of the PCB and ideally without requiring the use of more than two levels of the PCB to support the traces.

SUMMARY OF THE INVENTION

A hard disk controller (HDC) chip has differential connector element pairs. One connector element of each pair is disposed closest to an edge of the chip and the other connector element of the pair is inboard thereof to facilitate connection to more than one type of printed circuit board (PCB) pinout without crossing traces of a pair while maintaining traces of a pair on the same PCB level as each other. In non-limiting implementations the HDC chip can support SAS, SATA, and FCAL interfaces.

In a non-limiting SAS and FCAL embodiments, the connector element pairs may be arranged in interchangeable "A" and "B" ports which are configured to transfer data between a HDC processor on the chip and a host computer.

In other non-limiting embodiments, the connector elements can be at least partially spherical. The HDC chip can be used in combination with at least one disk of a hard disk drive and in combination with a printed circuit board (PCB). Each connector element of the HDC chip is associated with an electrically conductive trace extending between it and a connector element on the PCB, with the traces associated with a pair of differential connector elements extending coplanar with each other without crossing each other. The PCB, without limitation, may be configured to use a serial interface such as SAS or a fibre channel arbitrated loop ("FCAL") interface.

In another aspect a hard disk controller (HDC) chip includes a HDC processor and a first input/output (I/O) port having at least two pairs of differential connector elements. The first port is electrically connected to the HDC processor for sending data to and receiving data from a host computer. A second I/O port that has at least two pairs of differential connector elements is electrically connected to the HDC processor for sending data to and receiving data from a host computer. The ports are mirror images of each other.

In still another aspect, a hard disk drive (HDD) includes at least one data storage disk and at least one head juxtaposed with disk for data transfer therewith. A HDD processor communicates with the head. A printed circuit board (PCB) is configured for engagement with a connector of a host computer, with a HDD chip bearing the HDD processor engaged with the PCB by at least two ports. The ports are configured to facilitate connection to more than one type of printed circuit board (PCB) connector element arrangement without crossing traces from a pair of related connector elements on the chip.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENT

Figure 1:
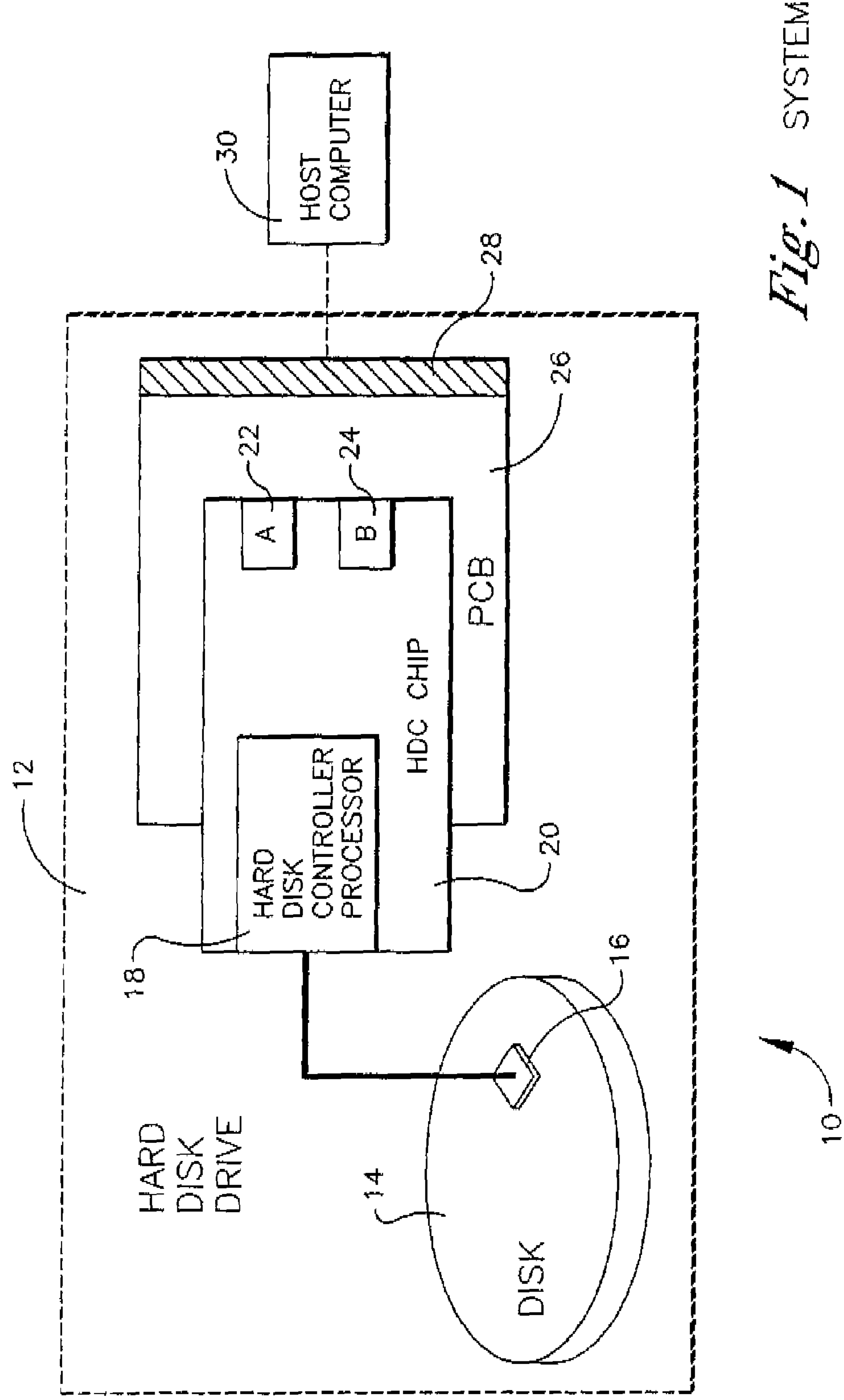
FIG. 1 is block diagram of the present system architecture.

Referring initially to FIG. 1, a system is shown, generally designated 10, which includes a hard disk drive (HDD) 12 having one or more storage disks 14 (only a single disk shown for clarity) with which data is transferred by means of one or more heads 16 (only a single head 16 shown for clarity). Data transfer is executed under control of a hard disk controller (HDC) processor 18 that is borne on a HDC chip 20. In turn, at least two input/output (I/O) ports 22, 24, referred to herein as "A" and "B" ports, respectively, can be on the HDC chip 20 in SAS and FCAL implementations for establishing communication with connector structure on a printed circuit board (PCB) 26, which structure is discussed further below. The PCS 26 includes an external connector 28 that can be engaged with a complementarily-configured connector on a host computer 30, such as but not limited to a PC or laptop computer.

In non-limiting implementations the communication protocol between the HDD 12 and host computer 30 is serial as set forth further below. It is to be understood however that the present claims are not necessarily limited to serial communication. In any case, in the implementations discussed further below the connector elements are arranged in such a way as to afford the ability to mount the HDD chip 20 onto one of several different types of PCBs (e.g., SATA, SAS, and FCAL), without crossing traces that run between a pair of differential connector elements on the HDC chip and corresponding connector elements on the PCB and while maintaining traces of a pair parallel to each other and on the same PCB level. In dual port implementations (which apply to, e.g., SAS and FCAL), "A" and "B" ports 22, 24 are configured identically to each other. By "interchangeable" in regard to the "A" and "B" ports 22, 24 is meant that the "A" port 22 on the HDC chip 20 can be engaged with either an "A" or "B" port on the PCB 26 that the "B" port 24 on the HDC chip 20 can be engaged with the remaining port ("B" or "A") on the PCB 26 without loss of functionality.

Figure 2:
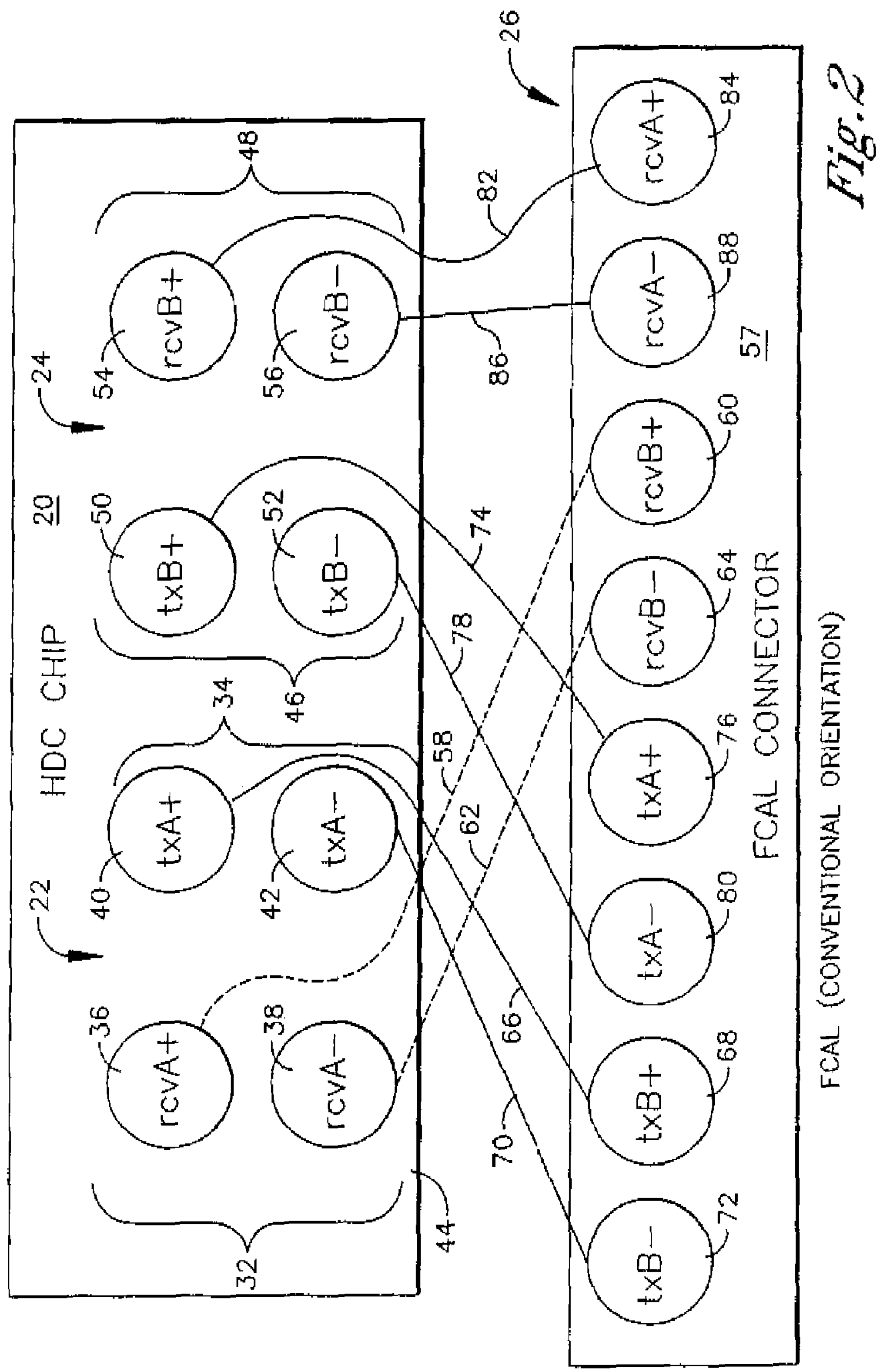
FIG. 2 is a schematic diagram of the HDD chip ports and the traces to a PCB configured as a FCAL PCB in a first orientation, with solid lines indicating traces on one PCB level and dashed lines indicating traces on a second PCB level.

Now referring to FIG. 2, the non-limiting HDC chip 20 includes the "A" and "B" ports 22, 24 as shown, with the ports 22, 24 being interchangeable with each other in accordance with the above definition. Consider that the "A" port includes first and second pairs 32, 34 of differential connector elements 36, 38 and 40, 42, respectively, with the "A" port 22 connector elements 36, 38 of the first (left-most) pair 32 being receive connector elements. The negative polarity receive connector element 38 is closest to the edge 44 of the HDC chip 20 as shown, and its associated positive polarity receive connector element 36 is substantially directly inboard (relative to the edge 44) of the negative polarity receive connector element 38. Because one connector element of a pair is behind the other relative to the edge 44, the trace from the rear element can be routed to the left or to the right of the front element as required to avoid crossing the elements, as shown and discussed further below.

In contrast, the connector elements 40, 42 of the second pair 34 of connector elements of the "A" port 22, which are to the right of the first pair 32, are transmit connector elements. However, like the receive connector elements 38, 36 in the first pair 32, the negative polarity transmit connector element 42 in the second pair 34 is closest to the edge 44 of the HDC chip 20 and its associated positive polarity transmit connector element 40 is substantially directly inboard (relative to the edge 44) of the negative polarity transmit connector element 42. The negative polarity connector elements 38, 42 establish a front row of connector elements and the positive polarity connector elements 36, 40 establish a second row that is behind (relative to the edge 44) the front row.

The above is the same configuration of the "B" port 24 except the transmit and receive pairs of the "B" port are arranged relative to those of the "A" port as a mirror image. Consider that the "B" port includes first and second pairs 46, 48 of differential connector elements 50, 52 and 54, 56, respectively, with the "B" port 24 connector elements 50, 52 of the first (left-most) pair 46 being transmit connector elements. The negative polarity transmit connector element 52 is closest to the edge 44 of the HDC chip 20 as shown, and its associated positive polarity transmit connector element 50 is substantially directly inboard (relative to the edge 44) of the negative polarity transmit connector element 52. In contrast, the connector elements 54, 56 of the second pair 48 of connector elements of the "B" port 24) which are to the right of the first pair 46, are receive connector elements. However, like the transmit connector elements 52, 50 in the first pair 46, the negative polarity receive connector element 56 in the second pair 48 is closest to the edge 44 of the HDC chip 20 and its associated positive polarity receive connector element 54 is substantially directly inboard (relative to the edge 44) of the negative polarity receive connector element 56. The negative polarity connector elements 52, 56 establish a front row of connector elements and the positive polarity connector elements 50, 54 establish a second row that is behind (relative to the edge 44) the front row.

As shown in FIG. 2, the connector elements of the HDC chip 20, which may be "ball" connector elements, are electrically connected to corresponding connector elements on a first side 57 of the PCB 26 by traces, meaning by electrically conductive paths. In the particular embodiment shown in FIG. 2, the PCB 26 is arranged in a first FCAL layout, which results in the "A" port 22 of the HDC chip 20 being connected to "B" connector elements of the PCB 26 and vice-versa. However, it will readily be appreciated that owing to the interchageability of the "A" and "B" ports 22, 24 of the HDC chip 20, this is not a problem.

With more specificity, the "A" port positive receive connector element 36 on the HDC chip 20 is connected by a trace 58 to the "B" positive receive connector element 60 on the PCB 26, whereas the "A" port negative receive connector element 38 on the HDC chip 20 is connected by a trace 62 to the "B" negative receive connector element 64 on the PCB 26.

At this point it can readily be appreciated that like the other traces shown herein of the other pairs of differential connector elements, the traces 58, 62 are generally parallel to each other and, as indicated by the dashed lines, exist substantially co-planar with each other, i.e., are on a first level of the PCB as each other. Moreover, all the other traces in FIG. 2 are shown in solid lines, indicating that they are all on a second PCB level, so that the entire trace scheme shown in FIG. 2, like those shown in FIGS. 3-5, requires the use of at most two PCB levels (which could be front and back surfaces of the PCB), with the traces of a differential pair always existing on the same level as each other and not crossing each other owing to the tandem relationship of connector elements within a pair, which gives rise to the ability to run the rear element trace to the left or to the right of the front element as required to avoid crossing.

Completing the description of FIG. 2, the "A" port positive transmit connector element 40 on the HDC chip 20 is connected by a trace 66 to the "B" positive transmit connector element 68 on the PCB 26, whereas the "A" port negative transmit connector element 42 on the HDC chip 20 is connected by a trace 70 to the "B" negative transmit connector element 72 on the PCB 26. With respect to the "B" port 24 of the HDC chip 20, the positive transmit connector element 50 on the HDC chip 20 is connected by a trace 74 to the "A" positive transmit connector element 76 on the PCB 26, whereas the "B" port negative transmit connector element 52 on the HOC chip 20 is connected by a trace 78 to the "A" negative transmit connector element 80 on the PCB 26, The "B" port positive receive connector element 54 on the HDC chip 20 is connected by a trace 82 to the "A" positive receive connector element 84 on the PCB 26, whereas the "B" port negative receive connector element 56 on the HDC chip 20 is connected by a trace 86 to the "A" negative receive connector element 88 on the PCB 26.

Figure 3:
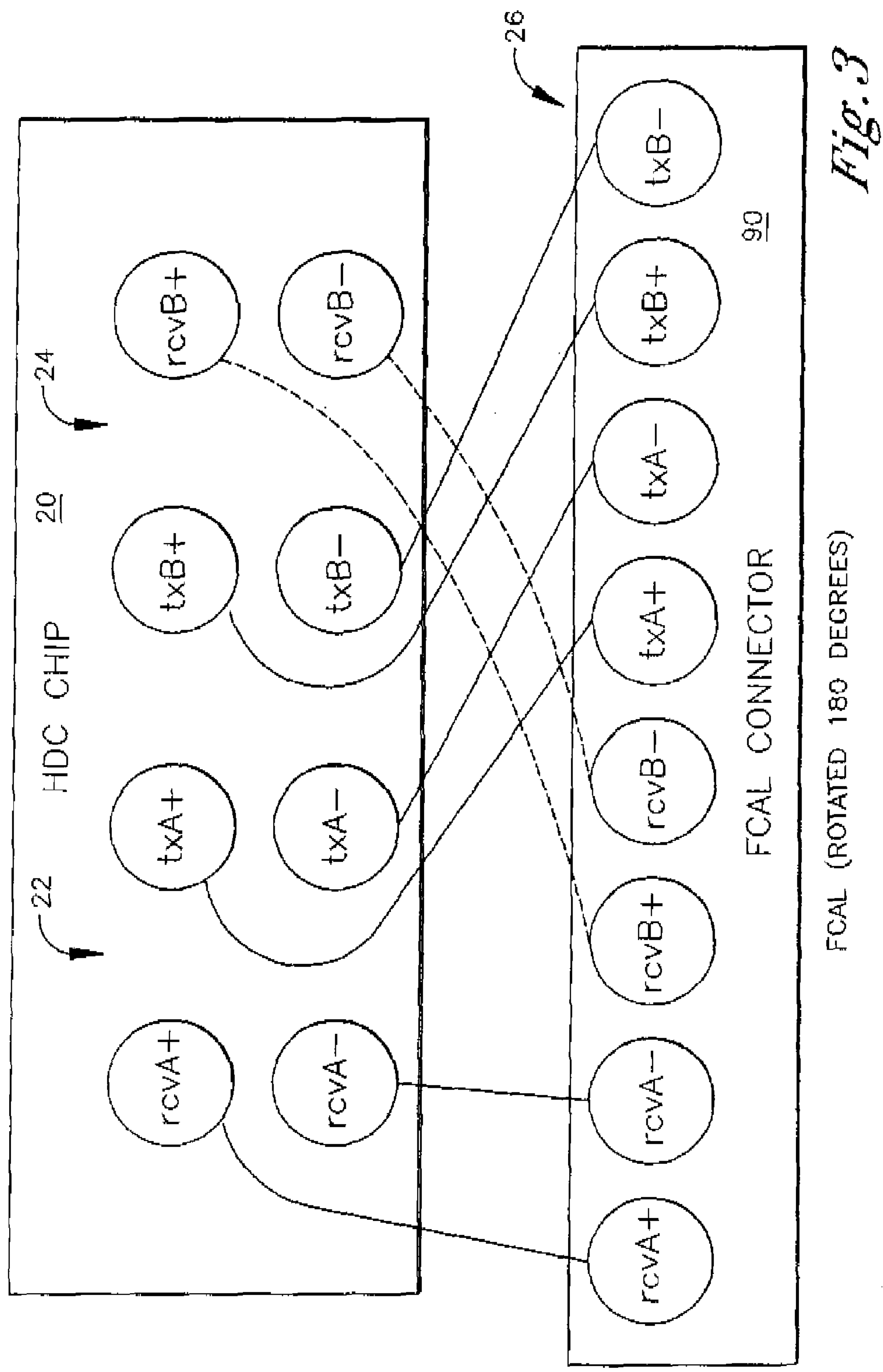
FIG. 3 is a schematic diagram of the HDD chip ports and the traces to a PCB configured as a FCAL PCB in an orientation rotated 180° from that shown in FIG. 2, with solid lines indicating traces on one PCB level and dashed lines indicating traces on a second PCB level.

FIG. 3 shows that owing to the interchangeability of the "A" and "B" ports 22, 24 of the HDC chip 20, the HDC chip 20 may be engaged with connector elements on the side 90 of the PCB 26 that is opposite the side 57 shown in FIG. 2, and that consequently are arranged in a mirror image of the arrangement of the side 57 shown in FIG. 2. Nonetheless, no traces of a differential pair cross each other and pairs of differential traces are generally parallel to each other. Owing to mirror image arrangement of the "A" and "B" ports 22, 24 of the HDC chip 20, the only difference between the configurations of FIGS. 2 and 3 is that in FIG. 2, the "A" port connector elements of the HOC chip 20 are connected to corresponding "B" connector elements of the PCB 26 and the "B" port connector elements of the HDC chip 20 are connected to corresponding "A" connector elements of the PCB 26, whereas in FIG. 3 the "A" port of the HDC chip 20 is connected to the "A" port elements of the PCB 26 and the "B" port of the HDC chip 20 is connected to the "B" port elements of the PCB 26.

Figure 4:
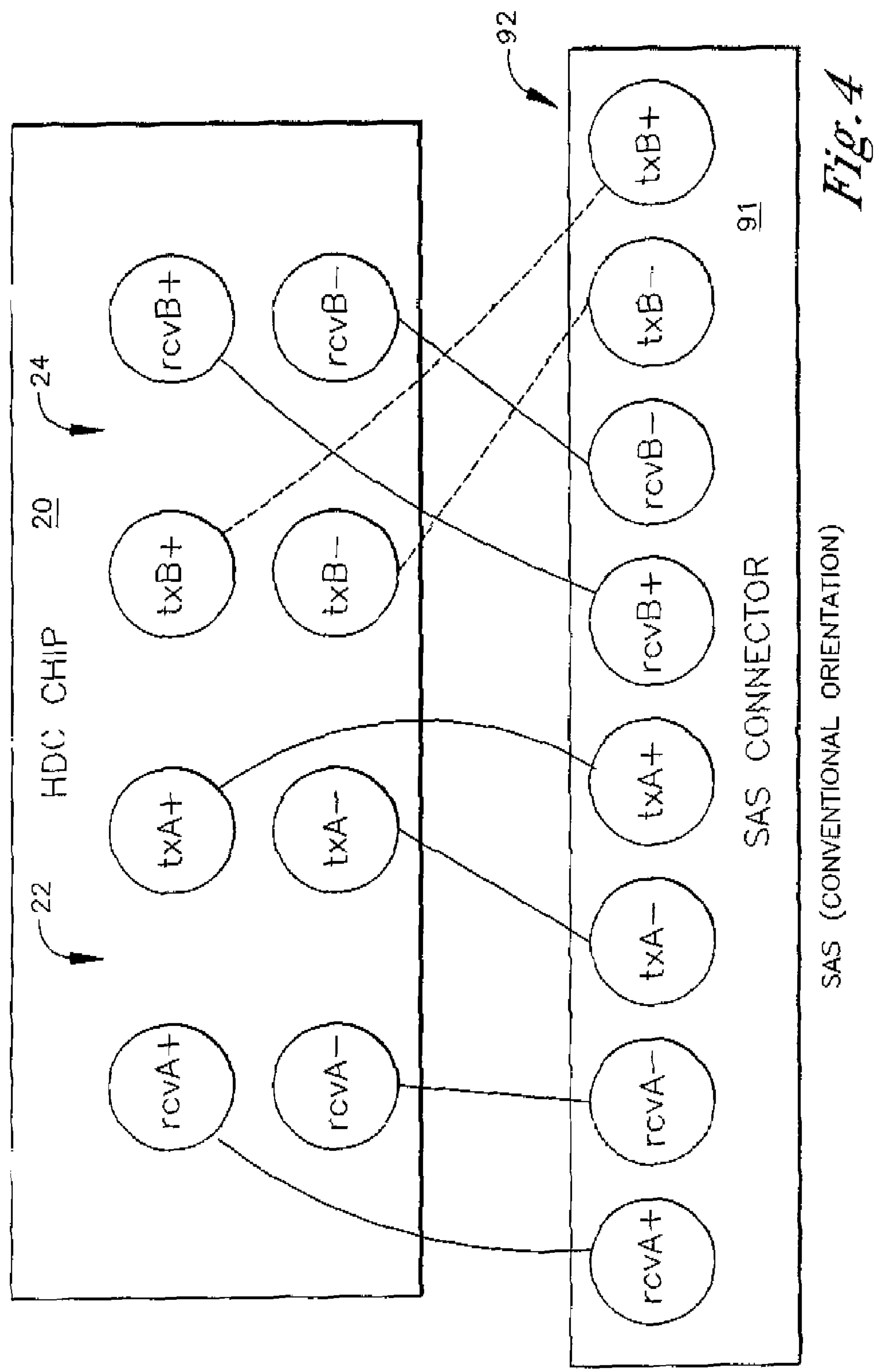
FIG. 4 is a schematic diagram of the HDD chip ports and the traces to a PCB configured as a SAS PCB in a first orientation, with solid lines indicating traces on one PCB level and dashed lines indicating traces on a second PCB level.
Figure 5:
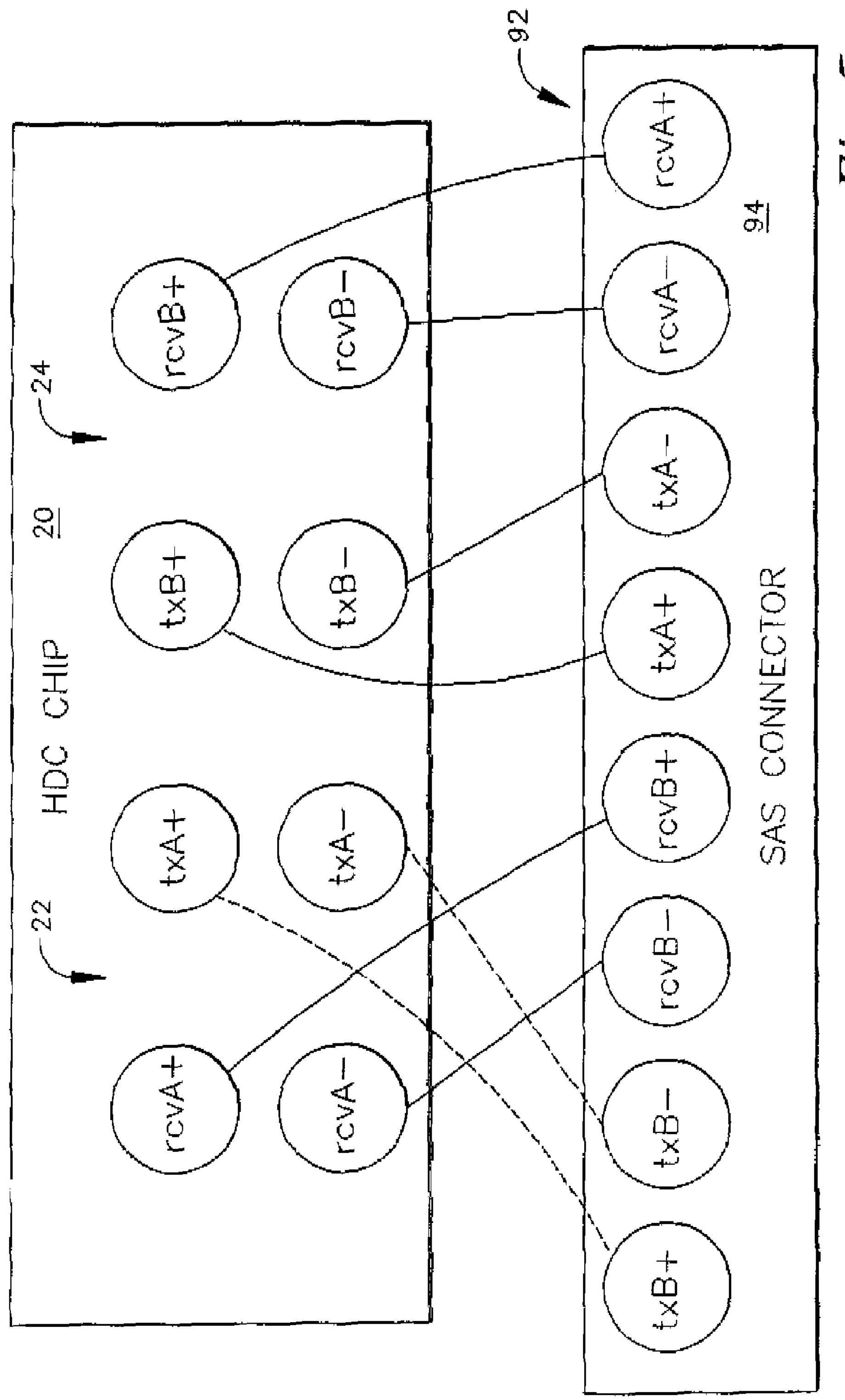
FIG. 5 is a schematic diagram of the HDD chip ports and the traces to a PCB configured as a SAS PCB in an orientation rotated 180° from that shown in FIG. 2, with solid lines indicating traces on one PCB level and dashed lines indicating traces on a second PCB level.

FIGS. 4 and 5 show that instead of the FCAL PCB 26, the HDC chip 20 may be engaged with a first side 91 of a PCB 92 (FIG. 3) that is configured as a SAS interface connector or with a second "mirror image" side 94 (FIG. 4) of the PCB 92, again without crossing differential pairs of traces and with maintaining the traces of a pair on the same level of the PCB, and without requiring the use of more than two PCB levels total.

While the figures herein show that differential pairs of connector elements on the HDC chip 20 have all negative polarity elements nearest the edge 44 of the chip, it is to be understood that all positive polarity elements can be nearest the edge, or that as among pairs in a port the polarities nearest the edge can alternate, as long as the ports are interchangeable and traces of a pair do not cross each other on the same plane of the PCB.

The principles above apply to single port SATA interfaces as well, and in particular the placement of one polarity behind the other apply to SATA interfaces.

While the particular VERSATILE DUAL PORT CONNECTOR ELEMENT ARRANGEMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A hard disk controller (HDC) chip comprising:

a HDC processor;

a first input/output (I/O) port having at least two pairs of differential connector elements, the first port being electrically connected to the HDC processor for sending data to and receiving data from a host computer; and a second I/O port having at least two pairs of differential connector elements, the second port being electrically connected to the HDC processor for sending data to and receiving data from a host computer, the ports being minor images of each other.

2. The HDC chip of claim 1, wherein each pair of differential connector elements includes a first connector element having a first polarity and a second connector element having a second polarity opposite the first polarity.

3. The HDC chip of claim 2, wherein the chip defines an edge and wherein for each pair of differential connector elements one connector element is disposed closer to the edge than the other connector element, which is substantially inboard on the chip relative to its associated connector element.

4. The HDC chip of claim 3, wherein each first connector element is disposed closer to the edge than its associated second connector element.

5. The HDC chip of claim 1, wherein the connector elements are at least partially spherical.

6. The HDC chip of claim 1, in combination with at least one disk of a hard disk drive.

7. The HDC chip of claim 3, in combination with a printed circuit board (PCB), wherein each connector element is associated with an electrically conductive trace extending between it and a connector element on the PCB, the traces associated with a pair of connector elements extending generally parallel to and coplanar with each other.

8. The HDC chip of claim 7, wherein the PCB is configured to use a serial interface.

9. The HDC chip of claim 7, wherein the PCB is configured to use a fibre channel arbitrated loop ("FCAL") interface.

* * * * *